D. D. T. BROWN.
POTATO DIGGER.

No. 181,768. Patented Sept. 5, 1876.

Witnesses: Inventor:

UNITED STATES PATENT OFFICE.

DANIEL D. T. BROWN, OF MUMFORD, NEW YORK, ASSIGNOR OF ONE-FOURTH HIS RIGHT TO WILLIAM D. GARBUTT, OF SAME PLACE.

IMPROVEMENT IN POTATO-DIGGERS.

Specification forming part of Letters Patent No. 181,768, dated September 5, 1876; application filed September 20, 1875.

*To all whom it may concern:*

Be it known that I, DANIEL D. T. BROWN, of Mumford, in the county of Monroe and State of New York, have invented certain new and useful Improvements in Potato-Diggers; and I do hereby declare that the following is a full, clear, and exact description thereof, reference being had to the accompanying drawings, making part of this specification, in which—

Figure 1:
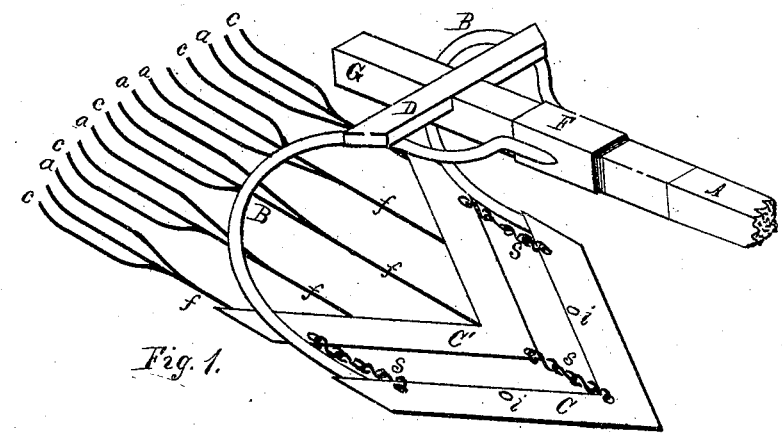
Figure 2:
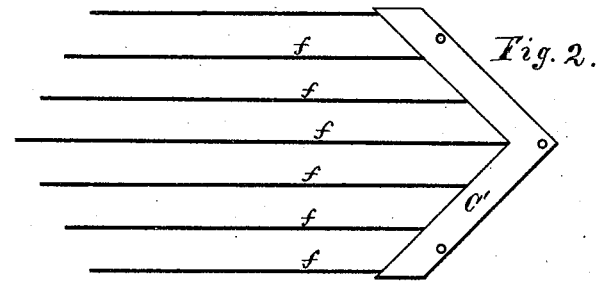

Figure 1 is a perspective view of my invention, and Fig. 2 a detached part.

Great difficulty has been heretofore experienced in the use of this class of machines, in effecting a separation of the tubers from the earth, especially in digging certain kinds of potatoes, mainly on account of the obstruction caused by the vines, which results, to a greater or less extent, in preventing the cutter-blade and the separator-fingers from performing properly their functions.

The object of my present invention, which involves improvements upon my former patent of June 11, 1872, No. 127,676, is to obviate these difficulties. It consists, mainly, in the employment of long separator-fingers, more or less bent upward at the rear end, and attached to the secondary cutter-blade of a peculiar formation.

In carrying out my invention I prefer the following general construction: The open V-shaped cutter C may be made of heavy sheet-steel, and welded or otherwise suitably attached to the draw-bars B. The upper ends of these bars may be fixed to the socket F, as shown, or they may be flattened and adjustably bolted to the tongue A by having two or more holes through the tongue, or through the flattened portion of the bars, for one of the clamping-bolts, whereby the apex or point of the cutter-blade may be raised or lowered with relation to the pole or tongue. The draw-bars B are braced by a cross-bar, D, framed to the pole. I prefer to use an auxiliary cutter-blade, C', to serve as a carrier for the separator-fingers $f$. This should be connected to the primary cutter by short links or chains $s$.

To this secondary cutter I attach, preferably, about five main separator-fingers, $f$, and to each of these are welded, part way back on one side, a branch or auxiliary finger, $a$. Still farther back, and on the opposite side of each, is welded another finger, $c$. These should be longest toward the center—that is, their ends should describe the segment of a circle, the radius being forward. Their ends should be bent upward more or less, as shown. Suitable handles, if desired, may be bolted to the tongue at G.

I have found by actual experiment that by this construction of the machine it will work in any and all kinds of soil, and effectually dig all the potatoes, leaving them on the surface in a very compact row, nearly all being centrally discharged. Neither the vines nor weeds appear to offer any obstruction to the perfect operation of this implement, as they pass between the draw-bars B, and are thus left lying upon the surface. As the cutter C is drawn through the earth under the hills the straight fingers $f$ follow at the same depth. The raised ends of the fingers separate the tubers from, and throw or force them upon the surface of, the earth. They are not supposed to be disturbed until they are acted upon by the raised ends of the fingers $f$, by which they are thrown out, as before stated.

By means of the links $s$ greater freedom is permitted in turning at the end of the rows.

It will be seen that scarcely any disturbance in the position of the soil is effected by this machine, and consequently it is very light of draft.

What I claim as my invention is—

The V-shaped cutters C C', loosely attached together, the rear cutter C' having fingers $f$ rigidly fixed thereto, in combination with the curved draft-rods B and rigid pole A, as and for the purposes set forth.

DANIEL D. T. BROWN.

Witnesses:
   WM. S. LOUGHBOROUGH,
   E. B. WHITMORE.